United States Patent [19]
Jayapalan et al.

[11] Patent Number: 6,002,678
[45] Date of Patent: Dec. 14, 1999

[54] METHOD OF HANDING-OFF A REMOTE UNIT BASED ON OVERHEAD INFORMATION START TIMES

[75] Inventors: Jay Purushothaman Jayapalan, Buffalo Grove; Stephen H. Sanders, III, Chicago, both of Ill.

[73] Assignee: Motorola, Inc., Schaumburg, Ill.

[21] Appl. No.: 08/962,581

[22] Filed: Oct. 31, 1997

[51] Int. Cl.⁶ .................................................. H04Q 7/00
[52] U.S. Cl. .......................................... 370/331; 455/437
[58] Field of Search .................................... 370/328, 331, 370/332, 350, 503; 455/422, 436, 437, 438, 439, 442, 502; 375/354

[56] References Cited

U.S. PATENT DOCUMENTS

| | | | |
|---|---|---|---|
| 5,159,593 | 10/1992 | D'Amico et al. | 370/312 |
| 5,388,101 | 2/1995 | Dinkins | 370/312 |
| 5,392,353 | 2/1995 | Morales | 380/20 |
| 5,633,872 | 5/1997 | Dinkins | 370/312 |

*Primary Examiner*—Ajit Patel
*Attorney, Agent, or Firm*—John B. MacIntyre

[57] ABSTRACT

The present invention provides a method of handing-off a remote unit (113) from a first base station (101) to a second base station (102). The remote unit (113) communicates with the first base station (101) and establishes communication with a second base station (102). It is then determined, preferably by the remote unit (113), that the remote unit (113) should hand-off to the second base station (102). An overhead information start time is then determined. The remote unit (102) may determine when the overhead information will be broadcast by the second bast station (102), thereby establishing an overhead information start time. The overhead information start time is the time when overhead information will be transmitted from the second base station (102). The first base station (101) and the second base station (102) may be synchronized to transmit the overhead information at approximately the same time. In this manner, the remote unit (102) can determine the overhead information start time at the second base station (102) by monitoring the overhead information start time at the first base station (101). The remote unit (113) is then handed off to the second base station (102) based upon the overhead information start time.

13 Claims, 2 Drawing Sheets

6,002,678

METHOD OF HANDING-OFF A REMOTE UNIT BASED ON OVERHEAD INFORMATION START TIMES

FIELD OF THE INVENTION

The present invention relates generally to a method for handing-off a remote unit from a first base station to a second base station in a communication system.

BACKGROUND OF THE INVENTION

Digital Cellular Systems are beginning to offer multiple bearer services that concurrently utilize a common infrastructure. Mobile stations, commonly referred to as remote units, also support multiple bearer service capabilities. For different bearer services, there can be different divisions of the hand-off functions between the mobile stations and the cellular infrastructure. As used herein, hand-off refers to the process of transitioning a remote unit from a first base station to a second base station. For example, when the mobile station is operating on an infrastructure-assigned traffic channel, such as for voice or circuit-switched data, the infrastructure will control hand-off of the remote unit. This hand-off can happen with input from the remote unit, or independent of the remote unit. In other cases, where the remote unit is using a shared channel, such as for packet-based data, control and access channels, or short message services, the remote unit may control the hand-off autonomously.

For autonomous remote unit hand-offs, as a remote unit hands off to another RF entity, such as an adjacent cell, the remote unit needs to acquire information concerning the new cell. Examples of such information include the configuration of the cell, the configuration of services at the new cell, or other configuration parameters. In some cases, the remote unit may need to acquire such information multiple times. This may occur when a cell that has more than one channel is assigned to transport packet data activity. A user that is handing-off into that cell will first obtain the overhead information from the primary channel assigned to packet data and then will determine, based on the primary channel overhead information, the specific secondary packet data channel it must use. The remote unit will then obtain the overhead information from the secondary packet data channel prior to beginning operation on the secondary channel. It is important to minimize the time required to complete the hand-off, especially for data services where any data that is lost or misdelivered during hand-off must be re-transmitted.

Consequently, a need exists for a method for handing-off a remote unit that must obtain overhead information from the target cell and minimizing the time required to perform the hand-off in order to minimize the amount of data that is delayed or lost during the hand-off.

DETAILED DESCRIPTION OF A PREFERRED EMBODIMENT

The present invention provides a method of handing-off a remote unit from a first base station to a second base station. The remote unit communicates with the first base station. The remote unit establishes communication with a second base station. It is then determined, preferably by the remote unit, that the remote unit should hand-off to the second base station. An overhead information start time, which is the time when overhead information will be transmitted from the second base station, is then determined. In a preferred embodiment, the remote unit determines when the overhead information will be broadcast by the second bast station, thereby establishing an overhead information start time. In an alternate embodiment, the first base station and the second base station are synchronized to transmit the overhead information at approximately the same time. In this manner, the remote unit can determine the overhead information start time at the second base station by monitoring the overhead information start time at the first base station. The remote unit is then handed off to the second base station based upon the overhead information start time.

Figure 1:
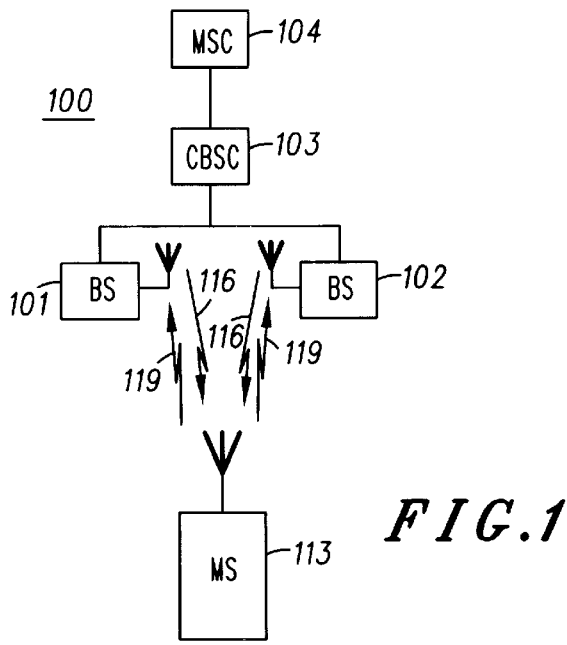
FIG. 1 depicts a wireless communication system in accordance with a preferred embodiment of the present invention.

The present invention can be better understood with reference to FIGS. 1–4. In accordance with a preferred embodiment of the present invention, FIG. 1 depicts a wireless communication system 100. Communication system 100 is preferably a Personal Digital Cellular (PDC) system, but may alternately be any other digital cellular communication system such as Code Division Multiple Access (CDMA), Group Special Mobile (GSM) systems, Time Division Multiple Access (TDMA), next generation CDMA, the next-generation CDMA protocols, including direct sequence spread spectrum or slow frequency hopping spread spectrum systems. Communication system 100 includes first base station 101, second base station 102, remote unit 113, Centralized Base Station Controller (CBSC) 103, and Mobile Switching Center (MSC) 104. Communication system 100 could also include additional base stations, but two are shown for clarity. Remote unit 113, first base station 101, and second base station 102 each include a logic unit that can process information, such as determinations of overhead information start times and a need to hand-off remote unit 113.

In the preferred embodiment of the present invention, base stations 101 and 102 are Motorola SC9600 base stations, MSC 104 is a Motorola EMX2500 MSC, and CBSC 103 is a Motorola SG1128BF CBSC component. As shown, remote unit 113 is communicating with base stations 101 and 102 via uplink communication signals 119, and base stations 101 and 102 are communicating with remote unit 113 via downlink communication signals 116. In the preferred embodiment, base stations 101 and 102 are suitably coupled to CBSC 103, and CBSC 103 is suitably coupled to MSC 104.

Preferred operation of communication system 100 occurs as follows: Remote unit 113 accesses first base station 101. Typically, this is accomplished by scanning for the strongest signals and acquiring synchronization channels or information on the overhead channels broadcast by base station 101. During communication with first base station 101, remote unit 113 acquires a signal from second base station 102. Upon a predetermined condition, such as receiving a stronger signal from second base station 102, it is determined to hand-off remote unit 113 to second base station 102. This determination can be accomplished at remote unit 113, first base station 101, or second base station 102. Base stations 101 and 102 both transmit overhead information. It is desired to have remote unit 113 hand-off to second base station 102 in such a manner as to minimize the time before the remote unit 113 can obtain the overhead information from base station 102. When base station 102 has more than one channel assigned to the service being used by remote unit 113, remote unit 113 will obtain the overhead information from the primary channel providing the service in base station 102. Based on the overhead information from the primary channel, remote unit 113 will transition to the assigned secondary channel and obtain the overhead information from the secondary channel.

Figure 2:
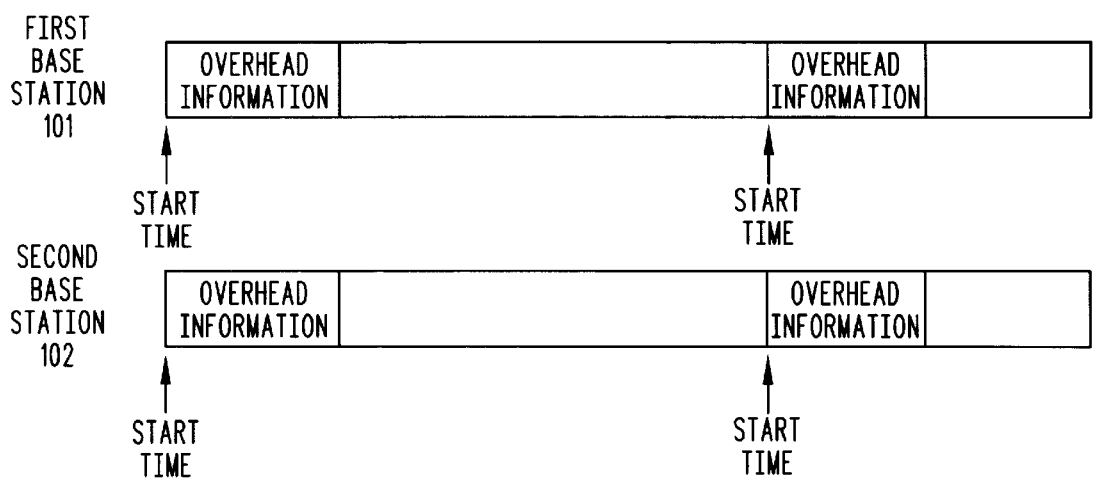
FIG. 2 depicts the overhead information start time operation of the communication system of FIG. 1 in accordance with the preferred embodiment of the present invention.

Two embodiments of the present invention are presented. In a preferred embodiment, as depicted in FIG. 2, base stations 101 and 102 are synchronized to transmit overhead information at approximately the same time. The overhead information is thereby time-aligned and provides an overhead information start time at base stations 101 and 102. Synchronizing the overhead information transmission start times accomplished via a central clock, such as a Global Positioning System, or via control communications among the base stations.

Figure 3:
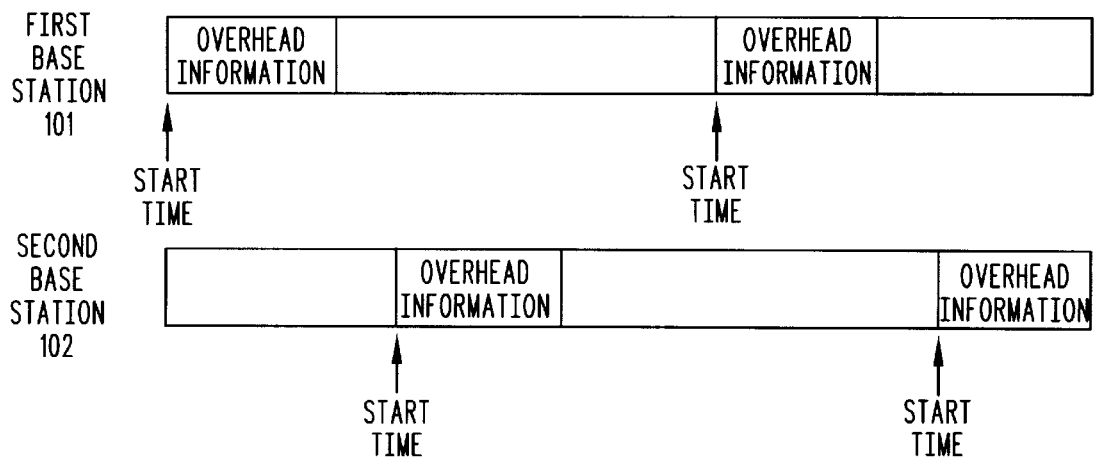
FIG. 3 depicts the overhead information start time operation of the communication system of FIG. 1 in accordance with an alternate embodiment of the present invention.

In an alternate embodiment, as depicted in FIG. 3, remote unit 113 determines when the overhead information is to be transmitted from second base station 102. The base stations 101 and 102 are unsynchronized; however, each base station knows when neighboring stations broadcast their overhead information.

As used herein, overhead information refers to information relating to the communication system. The overhead information is broadcast to all remote units in the service area of that system. However, the overhead information will vary from one service area to another within the communication system, since the overhead information provides data specific to that service area. Examples of such information are System ID, Cell Site ID, Paging zone ID and information about neighboring cells. For packet data transmission, this overhead information must include packet zone ID for registration purposes and information about channels in the neighboring cells. This allows the remote unit to reduce the time it takes to acquire a new channel from another cell.

Remote unit 113 remains at the first base station 101 until a time prior to the transmission of the overhead information start time at second base station 102. Remote unit 113 hands-off in time to receive that overhead information from second base station 102. In this manner, the time it takes remote unit 113 to acquire the overhead information is minimized.

The overhead information among the cell sites and the overhead information on primary and secondary channels within a cell site are staggered by some pre-determined time. The amount of time by which the overhead information data is staggered between the primary and secondary channels equals the sum of time to read the current overhead information and the time to acquire the second channel by the remote unit 113. Other time durations may be used by systems depending on the hand-off method used by that particular system.

Figure 4:
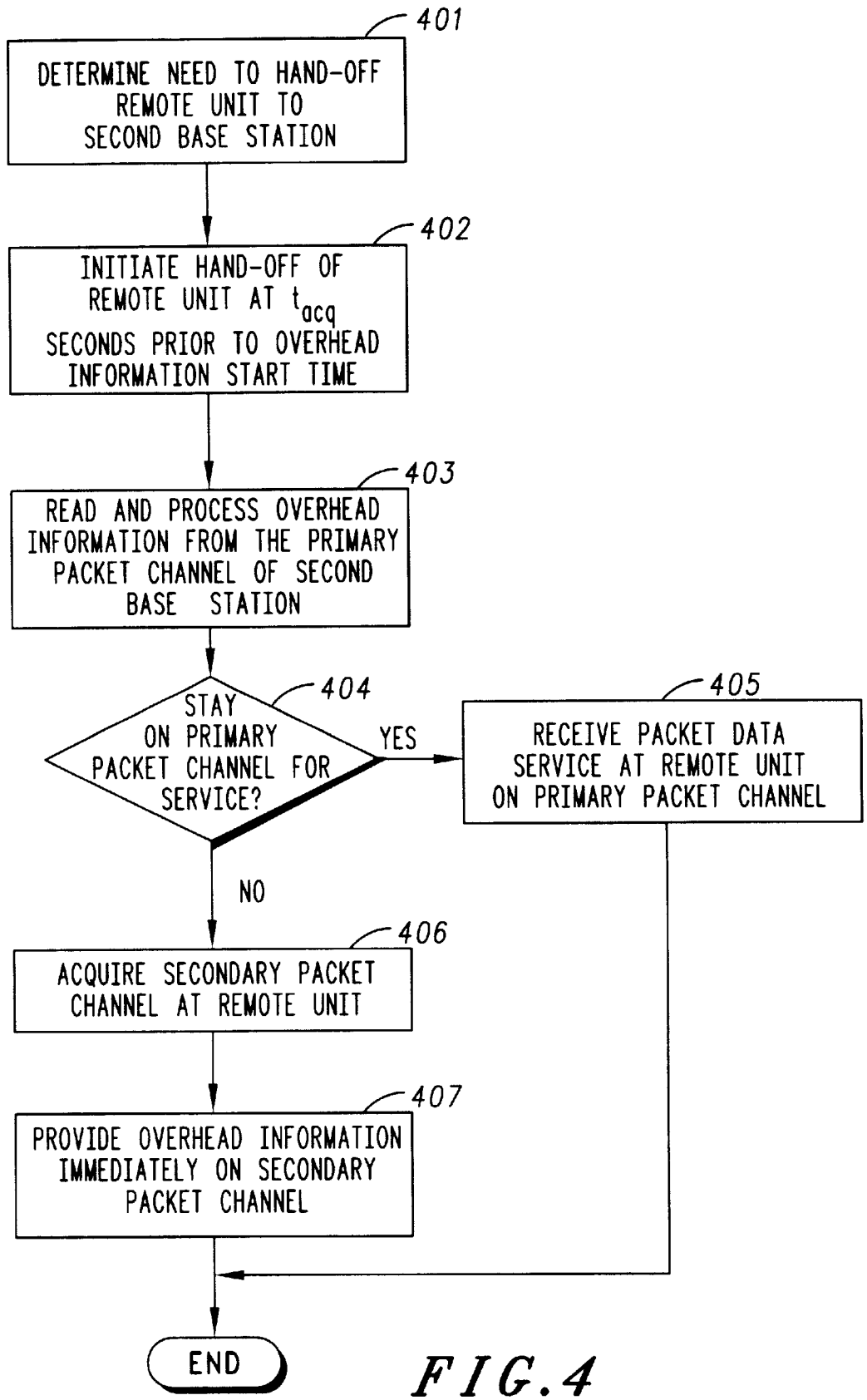
FIG. 4 is a flow chart illustrating operation of the communication system of FIG. 1 in accordance with the preferred embodiment of the present invention.

The following is a description, in accordance with the preferred embodiment, of how a remote unit moves to the primary packet channel of the target site, reads the overhead information and moves further to a secondary packet channel which will be used for user data transfer. As shown in FIG. 4, the remote unit determines (401) that it needs to hand-off. The remote unit chooses an appropriate time to move from the first base station to the second base station. The remote unit will preferably move from the current channel of the first base station to the primary packet channel of the second base station. Since overhead information on the first base station and the second base station is staggered by a known amount of time, the remote unit initiates (402) hand-off such that the remote unit acquires and arrives on the primary packet channel of the second base station when the overhead information on the second base station is about to be transmitted. This is done by determining a transition time ($t_{acq}$) for the remote unit, the transition time being the time it takes the remote unit to transition from the first base station to the second base station. Thus, if overhead information on the target channel is available at time $T_{o2}$, the remote unit initiates hand-off at $t_{acq}$ seconds prior to $T_{o2}$. The remote unit 113 reads and processes (403) the overhead information. The remote unit then determines (404) whether it should stay on the primary packet channel or if it should move to the secondary packet channel. If permitted, the remote unit receives (405) data service on the primary packet channel. However, the remote unit may determine that it needs to acquire a secondary packet channel to utilize the packet data service. The primary channel overhead information start time of the primary channel is transmitted at a first time. The secondary channel overhead information start time of the secondary channel is transmitted at a second time. The remote unit acquires (406) the secondary packet channel. The remote unit transitions from the primary channel to the secondary channel based on overhead information transmitted by the primary channel. The secondary packet channel provides (407) overhead information to the remote unit immediately upon arrival.

From the above example, it will be understood by those skilled in the art that various changes in form and detail may be made therein without departing from the spirit and scope of the invention. A system may require that a remote unit read the overhead information from a channel other than the primary packet channel first. The remote unit will be directed to a packet channel by this information.

Thus, the present invention provides a method of handing-off a remote unit from a first base station to a second base station. By handing-off the remote unit determining the overhead information start time at the second base station, the remote unit can hand-off to the second base station in time to receive the start of the next overhead information transmission. In this manner, the remote unit hands-off to the second base station in an efficient manner. The remote unit therefore hands-off in an efficient manner so as to begin hearing overhead information at the second base station without delay.

Further, the present invention keeps the amount of overhead information transmitted to a minimum on the channels that broadcast overhead information. The present invention also allows for network configuration changes, which result in overhead message changes being delivered to the remote units in a timely manner. The present invention can be used for any channel that is being shared by remote units, such as control and access channels.

Although the present invention has been described with respect to a Personal Digital Cellular (PDC) system, the present invention can also be used in any wireless system that performs autonomous hand-off and reads overhead information from more than one channel during the hand-off process. For example, the present invention can be utilized in Code Division Multiple Access (CDMA) systems, Time Division Multiple Access (TDMA) systems, Cellular Digital Packet Data (CDPD) systems, Group Special Mobile (GSM) systems, next generation CDMA systems, and the next-generation CDMA protocols, including direct sequence spread spectrum or slow frequency hopping spread spectrum systems.

While this invention has been certain examples the of certain examples thereof, it is not intended that it be limited to the above description, but rather only to the extent set forth in the claims that follow.

We claim:

1. A method of handing-off a remote unit from a first base station to a second base station, the method comprising:

communicating by the remote unit with the first base station;

determining a need to hand-off the remote unit to the second base station;

determining an overhead information start time, the overhead information start time being when overhead information will be transmitted from the second base station;

determining a transition time, the transition time being the time it takes the remote unit to transition from the first base station to the second base station; and handing-off the remote unit to the second base station based upon the overhead information start time and the transition time.

2. A method of handing-off a remote unit in accordance with claim 1, wherein the step of handing-off the remote unit further comprises handing-off the remote unit to the second base station based upon the transition time.

3. A method of handing-off a remote unit in accordance with claim 1, wherein the step of determining a need to hand-off the remote unit comprises determining the need at the remote unit.

4. A method of handing-off a remote unit in accordance with claim 1, wherein the step of determining an overhead information start time comprises determining an overhead information start time at the remote unit.

5. A method of handing-off a remote unit from a first base station to a second base station, the method comprising:

synchronizing overhead information between the first base station and the second base station to determine an overhead information start time;

communicating by the remote unit with the first base station;

determining a need to hand-off the remote unit to the second base station;

determining a transition time, the transition time being the time it takes the remote unit to transition from the first base station to the second base station; and handing-off the remote unit to the second base station based upon the overhead information start time and the transition time.

6. A method of handing-off a remote unit in accordance with claim 5, wherein the step of handing-off the remote unit to the second base station comprises handing-off the remote unit to the second base station such that the remote unit is able to acquire the overhead information from the second base station.

7. A method of handing-off a remote unit in accordance with claim 5, wherein the step of handing-off the remote unit further comprises handing-off the remote unit to the second base station based upon the transition time.

8. A method of handing-off a remote unit in accordance with claim 5, wherein the step of determining a need to hand-off the remote unit comprises determining the need at the remote unit.

9. A method of handing-off a remote unit from a first base station to a second base station having a primary channel and a secondary channel, the method comprising:

transmitting a primary channel overhead information start time of the primary channel at a first time;

transmitting a secondary channel overhead information start time of the secondary channel at a second time;

communicating by the remote unit with the first base station;

determining a need to hand-off the remote unit to the second base station;

determining a transition time, the transition time being the time it takes the remote unit to transition from the primary channel to the secondary channel;

handing-off the remote unit to the second base station based upon the primary channel overhead information start time and the transition time; and transitioning the remote unit from the primary channel in the second base station to a secondary channel in the second base station based on overhead information transmitted by the primary channel.

10. A method of handing-off a remote unit in accordance with claim 9, further comprising the step of determining a first transmission time, the first transmission time being the time it takes to transmit the primary channel overhead information start time on the primary channel.

11. A method of handing-off a remote unit in accordance with claim 10, wherein the step of transmitting a secondary channel overhead information start time is based upon the primary channel overhead information start time and the first transmission time.

12. A method of handing-off a remote unit in accordance with claim 9, wherein the step of transmitting a secondary channel overhead information start time is based upon the transition time.

13. A method of handing-off a remote unit from a first base station to a second base station, the method comprising:

time-aligning overhead information transmitted from a first base station and a second base station, the time-aligning providing an overhead information start time;

communicating by the remote unit with the first base station;

determining a transition time, the transition time being the time it takes the remote unit to transition from the first base station to the second base station; and handing-off the remote unit to the second base station based upon the overhead information start time and the transition time.

* * * * *